United States Patent
Miller et al.

(10) Patent No.: US 6,865,346 B1
(45) Date of Patent: Mar. 8, 2005

(54) FIBER OPTIC TRANSCEIVER

(75) Inventors: Gregory Miller, Foster City, CA (US); Josef Berger, Los Altos, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 598 days.

(21) Appl. No.: 09/875,499

(22) Filed: Jun. 5, 2001

(51) Int. Cl.[7] .................................................. H04B 10/00
(52) U.S. Cl. ......................... 398/135; 398/136; 398/139
(58) Field of Search .................................. 398/135, 136, 398/139, 169, 170, 183, 201

(56) References Cited

U.S. PATENT DOCUMENTS

| | | |
|---|---|---|
| 1,525,550 A | 2/1925 | Jenkins |
| 1,548,262 A | 8/1925 | Freedman |
| 1,814,701 A | 7/1931 | Ives |
| 2,415,226 A | 2/1947 | Sziklai ........................ 178/5.4 |
| 2,783,406 A | 2/1957 | Vanderhooft ................. 313/70 |
| 2,920,529 A | 1/1960 | Blythe ............................ 88/73 |
| 2,991,690 A | 7/1961 | Grey et al. ................... 88/16.6 |
| 3,256,465 A | 6/1966 | Weissenstern et al. ...... 317/101 |
| 3,388,301 A | 6/1968 | James ........................ 317/234 |
| 3,443,871 A | 5/1969 | Chitayat ..................... 356/106 |
| 3,553,364 A | 1/1971 | Lee ............................. 178/7.3 |
| 3,576,394 A | 4/1971 | Lee ............................. 178/7.3 |
| 3,600,798 A | 8/1971 | Lee ............................. 29/592 |
| 3,656,837 A | 4/1972 | Sandbank ................... 350/161 |
| 3,657,610 A | 4/1972 | Yamamoto et al. ......... 317/243 |
| 3,693,239 A | 9/1972 | Dix ............................. 29/470 |
| 3,743,507 A | 7/1973 | Ih et al. ........................ 96/81 |
| 3,752,563 A | 8/1973 | Torok et al. ................. 350/151 |
| 3,781,465 A | 12/1973 | Ernstoff et al. ......... 178/5.4 BD |
| 3,783,184 A | 1/1974 | Ernstoff et al. ......... 178/5.4 BD |
| 3,792,916 A | 2/1974 | Sarna .......................... 350/163 |
| 3,802,769 A | 4/1974 | Rotz et al. .................... 352/43 |
| 3,811,186 A | 5/1974 | Larnerd et al. ............... 29/626 |
| 3,861,784 A | 1/1975 | Torok ...................... 350/162 R |
| 3,862,360 A | 1/1975 | Dill et al. ................. 178/7.3 D |
| 3,871,014 A | 3/1975 | King et al. .................... 357/67 |
| 3,886,310 A | 5/1975 | Guldberg et al. ........ 178/7.5 D |
| 3,896,338 A | 7/1975 | Nathanson et al. ......... 315/373 |
| 3,915,548 A | 10/1975 | Opittek ....................... 350/3.5 |
| 3,935,499 A | 1/1976 | Oess ........................... 313/413 |
| 3,935,500 A | 1/1976 | Oess et al. .................. 313/495 |
| 3,938,881 A | 2/1976 | Biegelsen et al. .......... 350/161 |
| 3,941,456 A | 3/1976 | Schilz et al. ................ 350/161 |
| 3,942,245 A | 3/1976 | Jackson et al. ............... 29/591 |
| 3,943,281 A | 3/1976 | Keller et al. ............. 178/7.5 D |
| 3,947,105 A | 3/1976 | Smith .......................... 353/121 |
| 3,969,611 A | 7/1976 | Fonteneau .................. 219/502 |
| 3,980,476 A | 9/1976 | Wysocki ....................... 96/1.1 |
| 3,991,416 A | 11/1976 | Byles et al. ............. 340/324 R |
| 4,001,663 A | 1/1977 | Bray ............................. 321/2 |
| 4,004,849 A | 1/1977 | Shattuck .................. 350/160 R |
| 4,006,968 A | 2/1977 | Ernstoff et al. ........ 350/160 LC |
| 4,009,939 A | 3/1977 | Okano .................. 350/162 SF |
| 4,011,009 A | 3/1977 | Lama et al. ............. 350/162 R |
| 4,012,116 A | 3/1977 | Yevick ....................... 350/132 |

(List continued on next page.)

*Primary Examiner*—Jason Chan
*Assistant Examiner*—Dzung Tran
(74) *Attorney, Agent, or Firm*—Okamoto & Benedicto LLP

(57) ABSTRACT

A fiber optic transceiver capable of bi-directional communication comprises an incoming optical (downlink) signal, a detector comprising a detecting surface configured to detect a detected portion of the incoming optical signal that strikes the detecting surface, and a light modulator for modulating a reflected (uplink) signal. The reflected signal comprises a reflected portion of the incoming signal. The light modulator comprises a controllable reflection member for modulating the reflected signal, and a controller configured to control the controllable reflection member. The controllable reflection member implements micro-electro-mechanical systems (MEMS) technology wherein micro-reflective surfaces are physically positioned or oriented by the control signal, thereby affecting reflection and diffraction in such a way as to modulate the intensity of light entering an uplink channel.

23 Claims, 3 Drawing Sheets

U.S. PATENT DOCUMENTS

| | | | |
|---|---|---|---|
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,257,053 A | 3/1981 | Gilbreath | 346/108 |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.16 |
| 4,398,798 A * | 8/1983 | Krawczak et al. | 350/162.24 |
| 4,400,740 A * | 8/1983 | Traino et al. | 358/293 |
| 4,408,884 A * | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,011 A | 12/1985 | Kohara et al. | 356/81 |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |
| 4,636,039 A | 1/1987 | Turner | 350/356 |
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe | 358/241 |
| 4,652,932 A | 3/1987 | Miyajima et al. | 358/236 |
| 4,655,539 A | 4/1987 | Caulfield et al. | 350/3.6 |
| 4,660,938 A | 4/1987 | Kazan | 350/355 |
| 4,661,828 A | 4/1987 | Miller, Jr. et al. | 346/108 |
| 4,662,746 A | 5/1987 | Hornbeck | 350/269 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,710,732 A | 12/1987 | Hornbeck | 332/7.51 |
| 4,711,526 A | 12/1987 | Hennings et al. | 350/170 |
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |

| | | | | | | |
|---|---|---|---|---|---|---|
| 4,811,082 A | 3/1989 | Jacobs et al. ............... 357/80 | | 5,089,903 A | 2/1992 | Kuwayama et al. .......... 359/15 |
| 4,811,210 A | 3/1989 | McAulay ................... 364/200 | | 5,093,281 A | 3/1992 | Eshima ....................... 437/217 |
| 4,814,759 A | 3/1989 | Gombrich et al. .......... 340/771 | | 5,096,279 A | 3/1992 | Hornbeck et al. .......... 359/230 |
| 4,817,850 A | 4/1989 | Wiener-Avnear et al. ... 228/119 | | 5,099,353 A | 3/1992 | Hornbeck ................... 359/291 |
| 4,824,200 A | 4/1989 | Isono et al. .............. 350/96.16 | | 5,101,184 A | 3/1992 | Antes ......................... 235/454 |
| 4,827,391 A | 5/1989 | Sills ............................ 363/41 | | 5,101,236 A | 3/1992 | Nelson et al. ............... 355/229 |
| 4,829,365 A | 5/1989 | Eichenlaub .................... 358/3 | | 5,103,334 A | 4/1992 | Swanberg ................... 359/197 |
| 4,836,649 A | 6/1989 | Ledebuhr et al. ........ 350/331 R | | 5,105,207 A | 4/1992 | Nelson ....................... 346/160 |
| 4,856,863 A | 8/1989 | Sampsell et al. ......... 350/96.16 | | 5,105,299 A | 4/1992 | Anderson et al. ........... 359/223 |
| 4,856,869 A | 8/1989 | Sakata et al. .......... 350/162.18 | | 5,105,369 A | 4/1992 | Nelson ....................... 364/525 |
| 4,859,012 A | 8/1989 | Cohn ..................... 350/96.24 | | 5,107,372 A | 4/1992 | Gelbart et al. ............. 359/824 |
| 4,859,060 A | 8/1989 | Katagiri et al. ............. 356/352 | | 5,112,436 A | 5/1992 | Bol ............................ 156/643 |
| 4,866,488 A | 9/1989 | Frensley ....................... 357/4 | | 5,113,272 A | 5/1992 | Reamey ....................... 359/53 |
| 4,882,683 A | 11/1989 | Rupp et al. ................. 364/521 | | 5,113,285 A | 5/1992 | Franklin et al. ............ 359/465 |
| 4,893,509 A | 1/1990 | MacIver et al. ........ 73/517 AV | | 5,115,344 A | 5/1992 | Jaskie ........................ 359/573 |
| 4,896,325 A | 1/1990 | Coldren ....................... 372/20 | | 5,119,204 A | 6/1992 | Hashimoto et al. ......... 358/254 |
| 4,896,948 A | 1/1990 | Dono et al. ................. 350/355 | | 5,121,343 A | 6/1992 | Faris .......................... 395/111 |
| 4,897,708 A | 1/1990 | Clements ..................... 357/65 | | 5,126,812 A | 6/1992 | Greiff .......................... 357/25 |
| 4,902,083 A | 2/1990 | Wells .......................... 350/6.6 | | 5,126,826 A | 6/1992 | Kauchi et al. ................ 357/72 |
| 4,915,463 A | 4/1990 | Barbee, Jr. ................... 350/1.1 | | 5,126,836 A | 6/1992 | Um ............................. 358/60 |
| 4,915,479 A | 4/1990 | Clarke ........................ 350/345 | | 5,128,660 A | 7/1992 | DeMond et al. ............. 340/707 |
| 4,924,413 A | 5/1990 | Suwannukul ................ 364/521 | | 5,129,716 A | 7/1992 | Holakovszky et al. ........ 351/50 |
| 4,926,241 A | 5/1990 | Carey .......................... 357/75 | | 5,132,723 A | 7/1992 | Gelbart ......................... 355/40 |
| 4,930,043 A | 5/1990 | Wiegand ..................... 361/283 | | 5,132,812 A | 7/1992 | Takahashi et al. ............. 359/9 |
| 4,934,773 A | 6/1990 | Becker ........................ 350/6.6 | | 5,136,695 A | 8/1992 | Goldshlag et al. ........... 395/275 |
| 4,940,309 A | 7/1990 | Baum ......................... 350/171 | | 5,137,836 A | 8/1992 | Lam ............................. 437/8 |
| 4,943,815 A | 7/1990 | Aldrich et al. ............... 346/108 | | 5,142,303 A | 8/1992 | Nelson ....................... 346/108 |
| 4,945,773 A | 8/1990 | Sickafus .................. 73/862.59 | | 5,142,405 A | 8/1992 | Hornbeck ................... 359/226 |
| 4,949,148 A | 8/1990 | Bartelink ..................... 357/74 | | 5,142,677 A | 8/1992 | Ehlig et al. ................. 395/650 |
| 4,950,890 A | 8/1990 | Gelbart .................. 250/237 G | | 5,144,472 A | 9/1992 | Sang, Jr. et al. ............ 359/254 |
| 4,952,925 A | 8/1990 | Haastert ..................... 340/784 | | 5,147,815 A | 9/1992 | Casto ........................... 437/51 |
| 4,954,789 A | 9/1990 | Sampsell ..................... 330/4.3 | | 5,148,157 A | 9/1992 | Florence ..................... 340/783 |
| 4,956,619 A | 9/1990 | Hornbeck ................... 330/4.3 | | 5,148,506 A | 9/1992 | McDonald ................... 385/16 |
| 4,961,633 A | 10/1990 | Ibrahim et al. ............. 350/392 | | 5,149,405 A | 9/1992 | Bruns et al. ............. 204/129.1 |
| 4,963,012 A | 10/1990 | Tracy et al. ................ 350/641 | | 5,150,205 A | 9/1992 | Um et al. ..................... 358/60 |
| 4,970,575 A | 11/1990 | Soga et al. ................... 357/72 | | 5,151,718 A | 9/1992 | Nelson ....................... 346/160 |
| 4,978,202 A | 12/1990 | Yang ..................... 350/331 R | | 5,151,724 A | 9/1992 | Kikinis ........................ 357/17 |
| 4,982,184 A | 1/1991 | Kirkwood ................... 340/783 | | 5,151,763 A | 9/1992 | Marek et al. ................. 357/26 |
| 4,982,265 A | 1/1991 | Watanabe et al. ............. 357/75 | | 5,153,770 A | 10/1992 | Harris ......................... 359/245 |
| 4,984,824 A | 1/1991 | Antes et al. ................. 283/91 | | 5,155,604 A | 10/1992 | Miekka et al. ................. 359/2 |
| 4,999,308 A | 3/1991 | Nishiura et al. ............... 437/4 | | 5,155,615 A | 10/1992 | Tagawa ....................... 359/213 |
| 5,003,300 A | 3/1991 | Wells .......................... 340/705 | | 5,155,778 A | 10/1992 | Magel et al. .................. 385/18 |
| 5,009,473 A | 4/1991 | Hunter et al. ................. 350/6.6 | | 5,155,812 A | 10/1992 | Ehlig et al. ................. 395/275 |
| 5,013,141 A | 5/1991 | Sakata ........................ 350/348 | | 5,157,304 A | 10/1992 | Kane et al. .................. 313/495 |
| 5,018,256 A | 5/1991 | Hornbeck .................. 29/25.01 | | 5,159,485 A | 10/1992 | Nelson ....................... 359/291 |
| 5,022,750 A | 6/1991 | Flasck ......................... 353/31 | | 5,161,042 A | 11/1992 | Hamada ....................... 359/41 |
| 5,023,905 A | 6/1991 | Wells et al. ................. 379/96 | | 5,162,787 A | 11/1992 | Thompson et al. .......... 340/794 |
| 5,024,494 A | 6/1991 | Williams et al. .............. 350/3.6 | | 5,164,019 A | 11/1992 | Sinton ........................ 136/249 |
| 5,028,939 A | 7/1991 | Hornbeck et al. .......... 346/160 | | 5,165,013 A | 11/1992 | Faris .......................... 395/104 |
| 5,035,473 A | 7/1991 | Kuwayama et al. ........... 350/3.7 | | 5,168,401 A | 12/1992 | Endriz ........................ 359/625 |
| 5,037,173 A | 8/1991 | Sampsell et al. ............. 385/17 | | 5,168,406 A | 12/1992 | Nelson ....................... 359/855 |
| 5,039,628 A | 8/1991 | Carey ......................... 437/183 | | 5,170,156 A | 12/1992 | DeMond et al. ............. 340/794 |
| 5,040,052 A | 8/1991 | McDavid ..................... 357/80 | | 5,170,269 A | 12/1992 | Lin et al. ...................... 359/9 |
| 5,041,395 A | 8/1991 | Steffen ....................... 437/206 | | 5,170,283 A | 12/1992 | O'Brien et al. ............. 359/291 |
| 5,041,851 A | 8/1991 | Nelson ....................... 346/160 | | 5,172,161 A | 12/1992 | Nelson ....................... 355/200 |
| 5,043,917 A | 8/1991 | Okamoto .................... 364/518 | | 5,172,262 A | 12/1992 | Hornbeck ................... 359/223 |
| 5,048,077 A | 9/1991 | Wells et al. ................... 379/96 | | 5,177,724 A | 1/1993 | Gelbart .................... 369/44.16 |
| 5,049,901 A | 9/1991 | Gelbart ....................... 346/108 | | 5,178,728 A | 1/1993 | Boysel et al. ................ 156/656 |
| 5,058,992 A | 10/1991 | Takahashi ................... 359/567 | | 5,179,274 A | 1/1993 | Sampsell ................. 250/208.2 |
| 5,060,058 A | 10/1991 | Goldenberg et al. .......... 358/60 | | 5,179,367 A | 1/1993 | Shimizu ..................... 340/700 |
| 5,061,049 A | 10/1991 | Hornbeck ................... 359/224 | | 5,181,231 A | 1/1993 | Parikh et al. ................. 377/26 |
| 5,066,614 A | 11/1991 | Dunnaway et al. ........... 437/209 | | 5,182,665 A | 1/1993 | O'Callaghan et al. ......... 359/95 |
| 5,068,205 A | 11/1991 | Baxter et al. ................ 437/205 | | 5,185,660 A | 2/1993 | Um ............................. 358/60 |
| 5,072,239 A | 12/1991 | Mitcham et al. ............. 346/108 | | 5,188,280 A | 2/1993 | Nakao et al. ................ 228/123 |
| 5,072,418 A | 12/1991 | Boutaud et al. .......... 364/715.06 | | 5,189,404 A | 2/1993 | Masimo et al. .............. 340/720 |
| 5,074,947 A | 12/1991 | Estes et al. ............... 156/307.3 | | 5,189,505 A | 2/1993 | Bartelink .................... 257/419 |
| 5,075,940 A | 12/1991 | Kuriyama et al. ........... 29/25.03 | | 5,191,405 A | 3/1993 | Tomita et al. ............... 257/777 |
| 5,079,544 A | 1/1992 | DeMond et al. ............. 340/701 | | 5,192,864 A | 3/1993 | McEwen et al. ............. 250/234 |
| 5,081,617 A | 1/1992 | Gelbart ....................... 369/112 | | 5,192,946 A | 3/1993 | Thompson et al. .......... 340/794 |
| 5,083,857 A | 1/1992 | Hornbeck ................... 359/291 | | 5,198,895 A | 3/1993 | Vick ........................... 358/103 |
| 5,085,497 A | 2/1992 | Um et al. .................... 359/848 | | 5,202,785 A | 4/1993 | Nelson ....................... 359/214 |

| Patent Number | Date | Inventor(s) | Class |
|---|---|---|---|
| 5,206,629 A | 4/1993 | DeMond et al. | 340/719 |
| 5,208,818 A | 5/1993 | Gelbart et al. | 372/30 |
| 5,208,891 A | 5/1993 | Prysner | 385/116 |
| 5,210,637 A | 5/1993 | Puzey | 359/263 |
| 5,212,115 A | 5/1993 | Cho et al. | 437/208 |
| 5,212,555 A | 5/1993 | Stoltz | 358/206 |
| 5,212,582 A | 5/1993 | Nelson | 359/224 |
| 5,214,308 A | 5/1993 | Nishiquchi et al. | 257/692 |
| 5,214,419 A | 5/1993 | DeMond et al. | 340/794 |
| 5,214,420 A | 5/1993 | Thompson et al. | 340/795 |
| 5,216,278 A | 6/1993 | Lin et al. | 257/688 |
| 5,216,537 A | 6/1993 | Hornbeck | 359/291 |
| 5,216,544 A | 6/1993 | Horikawa et al. | 359/622 |
| 5,219,794 A | 6/1993 | Satoh et al. | 437/209 |
| 5,220,200 A | 6/1993 | Blanton | 257/778 |
| 5,221,400 A | 6/1993 | Staller et al. | 156/292 |
| 5,221,982 A | 6/1993 | Faris | 359/93 |
| 5,224,088 A | 6/1993 | Atiya | 369/97 |
| 5,226,099 A | 7/1993 | Mignardi et al. | 385/19 |
| 5,229,597 A | 7/1993 | Fukatsu | 250/208.2 |
| 5,230,005 A | 7/1993 | Rubino et al. | 372/20 |
| 5,231,363 A | 7/1993 | Sano et al. | 332/109 |
| 5,231,388 A | 7/1993 | Stoltz | 340/783 |
| 5,231,432 A | 7/1993 | Glenn | 353/31 |
| 5,233,456 A | 8/1993 | Nelson | 359/214 |
| 5,233,460 A | 8/1993 | Partlo et al. | 359/247 |
| 5,233,874 A | 8/1993 | Putty et al. | 73/517 AV |
| 5,237,340 A | 8/1993 | Nelson | 346/108 |
| 5,237,435 A | 8/1993 | Kurematsu et al. | 359/41 |
| 5,239,448 A | 8/1993 | Perkins et al. | 361/764 |
| 5,239,806 A | 8/1993 | Maslakow | 53/432 |
| 5,240,818 A | 8/1993 | Mignardi et al. | 430/321 |
| 5,245,686 A | 9/1993 | Faris et al. | 385/120 |
| 5,247,180 A | 9/1993 | Mitcham et al. | 250/492.1 |
| 5,247,593 A | 9/1993 | Lin et al. | 385/17 |
| 5,249,245 A | 9/1993 | Lebby et al. | 385/89 |
| 5,251,057 A | 10/1993 | Guerin et al. | 359/249 |
| 5,251,058 A | 10/1993 | MacArthur | 359/249 |
| 5,254,980 A | 10/1993 | Hendrix et al. | 345/84 |
| 5,255,100 A | 10/1993 | Urbanus | 358/231 |
| 5,256,869 A | 10/1993 | Lin et al. | 250/201.9 |
| 5,258,325 A | 11/1993 | Spitzer et al. | 437/86 |
| 5,260,718 A | 11/1993 | Rommelmann et al. | 346/107 R |
| 5,260,798 A | 11/1993 | Um et al. | 358/233 |
| 5,262,000 A | 11/1993 | Welbourn et al. | 156/643 |
| 5,272,473 A | 12/1993 | Thompson et al. | 345/7 |
| 5,278,652 A | 1/1994 | Urbanus et al. | 358/160 |
| 5,278,925 A | 1/1994 | Boysel et al. | 385/14 |
| 5,280,277 A | 1/1994 | Hornbeck | 345/108 |
| 5,281,887 A | 1/1994 | Engle | 310/335 |
| 5,281,957 A | 1/1994 | Schoolman | 345/8 |
| 5,285,105 A | 2/1994 | Cain | 257/672 |
| 5,285,196 A | 2/1994 | Gale, Jr. | 345/108 |
| 5,285,407 A | 2/1994 | Gale et al. | 365/189.11 |
| 5,287,096 A | 2/1994 | Thompson et al. | 345/147 |
| 5,287,215 A | 2/1994 | Warde et al. | 359/293 |
| 5,289,172 A | 2/1994 | Gale, Jr. et al. | 345/108 |
| 5,291,317 A | 3/1994 | Newswanger | 359/15 |
| 5,291,473 A | 3/1994 | Pauli | 369/112 |
| 5,293,511 A | 3/1994 | Poradish et al. | 257/434 |
| 5,296,408 A | 3/1994 | Wilbarg et al. | 437/203 |
| 5,296,891 A | 3/1994 | Vogt et al. | 355/67 |
| 5,296,950 A | 3/1994 | Lin et al. | 359/9 |
| 5,298,460 A | 3/1994 | Nishiguchi et al. | 437/183 |
| 5,299,037 A | 3/1994 | Sakata | 359/41 |
| 5,299,289 A | 3/1994 | Omae et al. | 359/95 |
| 5,300,813 A | 4/1994 | Joshi et al. | 257/752 |
| 5,301,062 A | 4/1994 | Takahashi et al. | 359/567 |
| 5,303,043 A | 4/1994 | Glenn | 348/40 |
| 5,303,055 A | 4/1994 | Hendrix et al. | 348/761 |
| 5,307,056 A | 4/1994 | Urbanus | 340/189 |
| 5,307,185 A | 4/1994 | Jones et al. | 359/41 |
| 5,310,624 A | 5/1994 | Ehrlich | 430/322 |
| 5,311,349 A | 5/1994 | Anderson et al. | 359/223 |
| 5,311,360 A | 5/1994 | Bloom et al. | 359/572 |
| 5,312,513 A | 5/1994 | Florence et al. | 156/643 |
| 5,313,479 A | 5/1994 | Florence | 372/26 |
| 5,313,648 A | 5/1994 | Ehlig et al. | 395/800 |
| 5,313,835 A | 5/1994 | Dunn | 73/505 |
| 5,315,418 A | 5/1994 | Sprague et al. | 359/41 |
| 5,315,423 A | 5/1994 | Hong | 359/124 |
| 5,315,429 A | 5/1994 | Abramov | 359/224 |
| 5,319,214 A | 6/1994 | Gregory et al. | 250/504 R |
| 5,319,668 A | 6/1994 | Luecke | 372/107 |
| 5,319,789 A | 6/1994 | Ehlig et al. | 395/800 |
| 5,319,792 A | 6/1994 | Ehlig et al. | 395/800 |
| 5,320,709 A | 6/1994 | Bowden et al. | 156/667 |
| 5,321,416 A | 6/1994 | Bassett et al. | 345/8 |
| 5,323,002 A | 6/1994 | Sampsell et al. | 250/252.1 |
| 5,323,051 A | 6/1994 | Adams et al. | 257/417 |
| 5,325,116 A | 6/1994 | Sampsell | 346/108 |
| 5,327,286 A | 7/1994 | Sampsell et al. | 359/561 |
| 5,329,289 A | 7/1994 | Sakamoto et al. | 345/126 |
| 5,330,301 A | 7/1994 | Brancher | 414/417 |
| 5,330,878 A | 7/1994 | Nelson | 430/311 |
| 5,331,454 A | 7/1994 | Hornbeck | 359/224 |
| 5,334,991 A | 8/1994 | Wells et al. | 345/8 |
| 5,339,116 A | 8/1994 | Urbanus et al. | 348/716 |
| 5,339,177 A | 8/1994 | Jenkins et al. | 359/35 |
| 5,340,772 A | 8/1994 | Rosotker | 437/226 |
| 5,345,521 A | 9/1994 | McDonald et al. | 385/19 |
| 5,347,321 A | 9/1994 | Gove | 348/663 |
| 5,347,378 A | 9/1994 | Handschy et al. | 359/53 |
| 5,347,433 A | 9/1994 | Sedlmayr | 362/32 |
| 5,348,619 A | 9/1994 | Bohannon et al. | 156/664 |
| 5,349,687 A | 9/1994 | Ehlig et al. | 395/800 |
| 5,351,052 A | 9/1994 | D'Hont et al. | 342/42 |
| 5,352,926 A | 10/1994 | Andrews | 257/717 |
| 5,354,416 A | 10/1994 | Okudaira | 156/643 |
| 5,357,369 A | 10/1994 | Pilling et al. | 359/462 |
| 5,357,803 A | 10/1994 | Lane | 73/517 B |
| 5,359,349 A | 10/1994 | Jambor et al. | 345/168 |
| 5,359,451 A | 10/1994 | Gelbart et al. | 359/285 |
| 5,361,131 A | 11/1994 | Tekemori et al. | 356/355 |
| 5,363,220 A | 11/1994 | Kuwayama et al. | 359/3 |
| 5,365,283 A | 11/1994 | Doherty et al. | 348/743 |
| 5,367,585 A | 11/1994 | Ghezzo et al. | 385/23 |
| 5,370,742 A | 12/1994 | Mitchell et al. | 134/10 |
| 5,371,543 A | 12/1994 | Anderson | 348/270 |
| 5,371,618 A | 12/1994 | Tai et al. | 359/53 |
| 5,377,705 A | 1/1995 | Smith, Jr. et al. | 134/95.3 |
| 5,382,961 A | 1/1995 | Gale, Jr. | 345/108 |
| 5,387,924 A | 2/1995 | Gale, Jr. et al. | 345/108 |
| 5,389,182 A | 2/1995 | Mignardi | 156/344 |
| 5,391,881 A | 2/1995 | Jeuch et al. | 250/370.09 |
| 5,392,140 A | 2/1995 | Ezra et al. | 359/41 |
| 5,392,151 A | 2/1995 | Nelson | 359/223 |
| 5,394,303 A | 2/1995 | Yamaji | 361/749 |
| 5,398,071 A | 3/1995 | Gove et al. | 348/558 |
| 5,399,898 A | 3/1995 | Rostoker | 257/499 |
| 5,404,365 A | 4/1995 | Hiiro | 372/27 |
| 5,404,485 A | 4/1995 | Ban | 395/425 |
| 5,408,123 A | 4/1995 | Murai | 257/531 |
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |

| | | | |
|---|---|---|---|
| 5,430,524 A | 7/1995 | Nelson ........................ 355/200 |
| 5,435,876 A | 7/1995 | Alfaro et al. ................. 156/247 |
| 5,438,477 A | 8/1995 | Pasch ......................... 361/689 |
| 5,439,731 A | 8/1995 | Li et al. ..................... 428/209 |
| 5,442,411 A | 8/1995 | Urbanus et al. ............. 348/771 |
| 5,442,414 A | 8/1995 | Janssen et al. ............... 353/98 |
| 5,444,566 A | 8/1995 | Gale et al. ................... 359/291 |
| 5,445,559 A | 8/1995 | Gale et al. ................... 451/388 |
| 5,446,479 A | 8/1995 | Thompson et al. .......... 345/139 |
| 5,447,600 A | 9/1995 | Webb ............................ 216/2 |
| 5,448,314 A | 9/1995 | Heimbuch et al. ........... 348/743 |
| 5,448,546 A | 9/1995 | Pauli ........................... 369/112 |
| 5,450,088 A | 9/1995 | Meier et al. ................... 342/51 |
| 5,450,219 A | 9/1995 | Gold et al. ..................... 359/40 |
| 5,451,103 A | 9/1995 | Hatanaka et al. .............. 353/31 |
| 5,452,024 A | 9/1995 | Sampsell ..................... 348/755 |
| 5,452,138 A | 9/1995 | Mignardi et al. ............. 359/855 |
| 5,453,747 A | 9/1995 | D'Hont et al. ................ 342/42 |
| 5,453,778 A | 9/1995 | Venkateswar et al. ....... 347/239 |
| 5,453,803 A | 9/1995 | Shapiro et al. .............. 353/119 |
| 5,454,160 A | 10/1995 | Nickel .......................... 29/840 |
| 5,454,906 A | 10/1995 | Baker et al. ................... 216/66 |
| 5,455,445 A | 10/1995 | Kurtz et al. .................. 257/419 |
| 5,455,455 A | 10/1995 | Badehi ........................ 257/690 |
| 5,455,602 A | 10/1995 | Tew ............................ 347/239 |
| 5,457,493 A | 10/1995 | Leddy et al. ................. 348/164 |
| 5,457,566 A | 10/1995 | Sampsell et al. ............ 359/292 |
| 5,457,567 A | 10/1995 | Shinohara ................... 359/305 |
| 5,458,716 A | 10/1995 | Alfaro et al. ................ 156/245 |
| 5,459,492 A | 10/1995 | Venkateswar ............... 347/239 |
| 5,459,528 A | 10/1995 | Pettitt ......................... 348/568 |
| 5,459,592 A | 10/1995 | Shibatani et al. .............. 359/40 |
| 5,459,610 A | 10/1995 | Bloom et al. ................ 359/572 |
| 5,461,197 A | 10/1995 | Hiruta et al. ............... 174/52.4 |
| 5,461,410 A | 10/1995 | Venkateswar et al. ....... 347/240 |
| 5,461,411 A | 10/1995 | Florence et al. ............. 347/240 |
| 5,461,547 A | 10/1995 | Ciupke et al. ................ 362/31 |
| 5,463,347 A | 10/1995 | Jones et al. .................. 330/253 |
| 5,463,497 A | 10/1995 | Muraki et al. ............... 359/618 |
| 5,465,175 A | 11/1995 | Woodgate et al. ........... 359/463 |
| 5,467,106 A | 11/1995 | Salomon ....................... 345/87 |
| 5,467,138 A | 11/1995 | Gove .......................... 348/452 |
| 5,467,146 A | 11/1995 | Huang et al. ................ 348/743 |
| 5,469,302 A | 11/1995 | Lim ............................ 359/846 |
| 5,471,341 A | 11/1995 | Warde et al. ................. 359/293 |
| 5,473,512 A | 12/1995 | Degani et al. ................ 361/760 |
| 5,475,236 A | 12/1995 | Yoshizaki ..................... 257/48 |
| 5,480,839 A | 1/1996 | Ezawa et al. ................. 437/209 |
| 5,481,118 A | 1/1996 | Tew ............................ 250/551 |
| 5,481,133 A | 1/1996 | Hsu ............................ 257/621 |
| 5,482,564 A | 1/1996 | Douglas et al. ................ 134/18 |
| 5,482,818 A | 1/1996 | Nelson ........................ 430/394 |
| 5,483,307 A | 1/1996 | Anderson ..................... 353/98 |
| 5,485,172 A | 1/1996 | Sawachika et al. ............ 345/8 |
| 5,485,304 A | 1/1996 | Kaeriyama .................. 359/291 |
| 5,485,354 A | 1/1996 | Ciupke et al. ................ 362/31 |
| 5,486,698 A | 1/1996 | Hanson et al. ............... 250/332 |
| 5,486,841 A | 1/1996 | Hara et al. ..................... 345/8 |
| 5,486,946 A | 1/1996 | Jachimowicz et al. ....... 359/263 |
| 5,488,431 A | 1/1996 | Gove et al. .................. 348/716 |
| 5,489,952 A | 2/1996 | Gove et al. .................. 348/771 |
| 5,490,009 A | 2/1996 | Venkateswar et al. ....... 359/291 |
| 5,491,510 A | 2/1996 | Gove ........................... 348/77 |
| 5,491,612 A | 2/1996 | Nicewarner, Jr. ........... 361/760 |
| 5,491,715 A | 2/1996 | Flaxl ........................... 375/344 |
| 5,493,177 A | 2/1996 | Muller et al. ................ 313/578 |
| 5,493,439 A | 2/1996 | Engle .......................... 359/292 |
| 5,497,172 A | 3/1996 | Doherty et al. ............... 345/85 |
| 5,497,197 A | 3/1996 | Gove et al. .................. 348/388 |
| 5,497,262 A | 3/1996 | Kaeriyama .................. 359/223 |
| 5,499,060 A | 3/1996 | Gove et al. .................. 348/651 |
| 5,499,062 A | 3/1996 | Urbanus ..................... 348/771 |
| 5,500,761 A | 3/1996 | Goossen et al. ............. 359/290 |
| 5,502,481 A | 3/1996 | Dentinger et al. ............. 348/51 |
| 5,504,504 A | 4/1996 | Markandey et al. ......... 345/214 |
| 5,504,514 A | 4/1996 | Nelson ........................ 347/130 |
| 5,504,575 A | 4/1996 | Stafford ...................... 356/330 |
| 5,504,614 A | 4/1996 | Webb et al. ................. 359/223 |
| 5,506,171 A | 4/1996 | Leonard et al. .............. 437/187 |
| 5,506,597 A | 4/1996 | Thompson et al. ............ 345/85 |
| 5,506,720 A | 4/1996 | Yoon .......................... 359/224 |
| 5,508,558 A | 4/1996 | Robinette, Jr. et al. ...... 257/700 |
| 5,508,561 A | 4/1996 | Tago et al. ................... 257/737 |
| 5,508,565 A | 4/1996 | Hatakeyama et al. ........ 257/777 |
| 5,508,750 A | 4/1996 | Hewlett et al. .............. 348/558 |
| 5,508,840 A | 4/1996 | Vogel et al. ................. 359/291 |
| 5,508,841 A | 4/1996 | Lin et al. ..................... 359/318 |
| 5,510,758 A | 4/1996 | Fujita et al. ................. 333/247 |
| 5,510,824 A | 4/1996 | Nelson ........................ 347/239 |
| 5,512,374 A | 4/1996 | Wallace et al. .............. 428/422 |
| 5,512,748 A | 4/1996 | Hanson ....................... 250/332 |
| 5,515,076 A | 5/1996 | Thompson et al. .......... 345/139 |
| 5,516,125 A | 5/1996 | McKenna ...................... 279/3 |
| 5,517,340 A | 5/1996 | Doany et al. .................. 359/41 |
| 5,517,347 A | 5/1996 | Sampsell ..................... 359/224 |
| 5,517,357 A | 5/1996 | Shibayama .................. 359/547 |
| 5,517,359 A | 5/1996 | Gelbart ....................... 359/623 |
| 5,519,251 A | 5/1996 | Sato et al. ................... 257/666 |
| 5,519,450 A | 5/1996 | Urbanus et al. ............. 348/600 |
| 5,521,748 A | 5/1996 | Sarraf ......................... 359/321 |
| 5,523,619 A | 6/1996 | McAllister et al. .......... 257/686 |
| 5,523,628 A | 6/1996 | Williams et al. ............. 257/777 |
| 5,523,803 A | 6/1996 | Urbanus et al. ............. 348/771 |
| 5,523,878 A | 6/1996 | Wallace et al. .............. 359/290 |
| 5,523,881 A | 6/1996 | Florence et al. ............. 359/561 |
| 5,523,920 A | 6/1996 | Machuga et al. ............ 361/767 |
| 5,524,155 A | 6/1996 | Weaver ......................... 385/24 |
| 5,526,834 A | 6/1996 | Mielnik et al. .............. 134/105 |
| 5,534,107 A | 7/1996 | Gray et al. ................ 156/643.1 |
| 5,534,883 A | 7/1996 | Koh ............................... 345/3 |
| 5,539,422 A | 7/1996 | Heacock et al. ................ 345/8 |
| 5,544,306 A | 8/1996 | Deering et al. .............. 395/164 |
| 5,552,635 A | 9/1996 | Kim et al. ................... 257/706 |
| 5,554,304 A | 9/1996 | Suzuki .......................... 216/2 |
| 5,576,878 A | 11/1996 | Henck ......................... 359/224 |
| 5,602,671 A | 2/1997 | Hornbeck .................... 359/224 |
| 5,606,181 A | 2/1997 | Sakuma et al. ................ 257/88 |
| 5,606,447 A | 2/1997 | Asada et al. ................. 359/199 |
| 5,610,438 A | 3/1997 | Wallace et al. .............. 257/682 |
| 5,623,361 A | 4/1997 | Engle .......................... 359/291 |
| 5,629,566 A | 5/1997 | Doi et al. .................... 257/789 |
| 5,629,801 A | 5/1997 | Staker et al. ................. 359/572 |
| 5,640,216 A | 6/1997 | Hasegawa et al. ............. 349/58 |
| 5,658,698 A | 8/1997 | Yagi et al. ..................... 430/11 |
| 5,661,592 A | 8/1997 | Bornstein et al. ........... 359/291 |
| 5,661,593 A | 8/1997 | Engle .......................... 359/292 |
| 5,663,817 A | 9/1997 | Frapin et al. ................... 349/5 |
| 5,668,611 A | 9/1997 | Ernstoff et al. .............. 348/771 |
| 5,673,139 A | 9/1997 | Johnson ...................... 359/291 |
| 5,677,783 A | 10/1997 | Bloom et al. ................ 359/224 |
| 5,689,361 A | 11/1997 | Damen et al. ............... 359/284 |
| 5,691,836 A | 11/1997 | Clark .......................... 359/247 |
| 5,694,740 A | 12/1997 | Martin et al. .................. 53/431 |
| 5,696,560 A | 12/1997 | Songer ........................ 348/436 |
| 5,699,740 A | 12/1997 | Gelbart ....................... 101/477 |
| 5,704,700 A | 1/1998 | Kappel et al. ................. 353/31 |
| 5,707,160 A | 1/1998 | Bowen ........................ 400/472 |
| 5,712,649 A | 1/1998 | Tosaki ........................... 345/8 |
| 5,713,652 A | 2/1998 | Zavracky et al. ............ 353/122 |
| 5,726,480 A | 3/1998 | Pister ......................... 257/415 |
| 5,731,802 A | 3/1998 | Aras et al. ................... 345/148 |
| 5,734,224 A | 3/1998 | Tagawa et al. .............. 313/493 |

| | | | |
|---|---|---|---|
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/126 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/293 |
| 5,773,473 A | 6/1998 | Hall et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,832,148 A | 11/1998 | Yariv | 385/16 |
| 5,835,255 A | 11/1998 | Miles | 359/291 |
| 5,835,256 A | 11/1998 | Huibers | 359/291 |
| 5,837,562 A | 11/1998 | Cho | 438/51 |
| 5,841,579 A | 11/1998 | Bloom et al. | 359/572 |
| 5,841,929 A | 11/1998 | Komatsu et al. | 385/129 |
| 5,844,711 A | 12/1998 | Long, Jr. | 359/291 |
| 5,847,859 A | 12/1998 | Murata | 359/201 |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 438/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,904,737 A | 5/1999 | Preston et al. | 8/158 |
| 5,910,856 A | 6/1999 | Ghosh et al. | 359/291 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,923,475 A | 7/1999 | Kurtz et al. | 359/619 |
| 5,926,309 A | 7/1999 | Little | 359/293 |
| 5,926,318 A | 7/1999 | Hebert | 359/618 |
| 5,942,791 A | 8/1999 | Shorrocks et al. | 257/522 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,982,553 A | 11/1999 | Bloom et al. | 359/627 |
| 5,986,634 A | 11/1999 | Alioshin | 345/126 |
| 5,986,796 A | 11/1999 | Miles | 359/260 |
| 5,991,058 A * | 11/1999 | Feuer et al. | 398/72 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,012,336 A | 1/2000 | Eaton et al. | 73/754 |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra et al. | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,096,576 A | 8/2000 | Corbin et al. | 438/108 |
| 6,096,656 A | 8/2000 | Matzke et al. | |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,154,305 A | 11/2000 | Dickensheets et al. | 358/225 |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansson | 361/233 |
| 6,241,143 B1 | 6/2001 | Kuroda | 228/110.1 |
| 6,251,842 B1 | 6/2001 | Gudeman | 508/577 |
| 6,252,697 B1 | 6/2001 | Hawkins et al. | 359/290 |
| 6,254,792 B1 | 7/2001 | Van Buskirk et al. | 216/13 |
| 6,261,494 B1 | 7/2001 | Zavracky et al. | 264/104 |
| 6,268,952 B1 | 7/2001 | Godil et al. | 359/291 |
| 6,271,145 B1 | 8/2001 | Toda | 438/706 |
| 6,271,808 B1 | 8/2001 | Corbin | 345/7 |
| 6,274,469 B1 | 8/2001 | Yu | 438/592 |
| 6,286,231 B1 | 9/2001 | Bergman et al. | 34/410 |
| 6,290,859 B1 | 9/2001 | Fleming et al. | 216/2 |
| 6,290,864 B1 | 9/2001 | Patel et al. | 216/79 |
| 6,300,148 B1 | 10/2001 | Birdsley et al. | 438/15 |
| 6,303,986 B1 | 10/2001 | Shook | 257/680 |
| 6,310,018 B1 | 10/2001 | Behr et al. | 510/175 |
| 6,323,984 B1 | 11/2001 | Trisnadi | 359/245 |
| 6,327,071 B1 | 12/2001 | Kimura | 359/291 |
| 6,342,960 B1 | 1/2002 | McCullough | 359/124 |
| 6,356,577 B1 | 3/2002 | Miller | 372/107 |
| 6,356,689 B1 | 3/2002 | Greywall | 385/52 |
| 6,359,333 B1 | 3/2002 | Wood et al. | 257/704 |
| 6,384,959 B1 | 5/2002 | Furlani et al. | 359/291 |
| 6,387,723 B1 | 5/2002 | Payne et al. | 438/48 |
| 6,392,309 B1 | 5/2002 | Wataya et al. | 257/796 |
| 6,396,789 B1 | 5/2002 | Guerra et al. | 369/112 |
| 6,438,954 B1 | 8/2002 | Goetz et al. | 60/527 |
| 6,445,502 B1 | 9/2002 | Islam et al. | 359/571 |
| 6,452,260 B1 | 9/2002 | Corbin et al. | 257/686 |
| 6,454,470 B1 * | 9/2002 | Dwarkin et al. | 385/93 |
| 6,466,354 B1 | 10/2002 | Gudeman | 359/247 |
| 6,480,634 B1 | 11/2002 | Corrigan | 385/4 |
| 6,493,121 B1 * | 12/2002 | Althaus | 398/135 |
| 6,497,490 B1 | 12/2002 | Miller | 359/614 |
| 6,525,863 B1 | 2/2003 | Riza | 359/290 |
| 6,539,159 B1 * | 3/2003 | Upton | 385/134 |

| | | | | | | |
|---|---|---|---|---|---|---|
| 6,563,974 B2 | 5/2003 | Riza ............................. 385/18 | 2002/0112746 A1 | 8/2002 | DeYoung et al. .............. 134/36 |
| 6,565,222 B1 | 5/2003 | Ishii et al. ................... 359/883 | 2002/0131228 A1 | 9/2002 | Potter ......................... 361/233 |
| 2001/0019454 A1 | 9/2001 | Tadic-Galeb et al. ........ 359/649 | 2002/0131230 A1 | 9/2002 | Potter ......................... 361/277 |
| 2002/0015230 A1 | 2/2002 | Pilossof et al. .............. 359/558 | 2002/0195418 A1 | 12/2002 | Kowarz et al. ............... 216/13 |
| 2002/0021485 A1 | 2/2002 | Pilossof ....................... 359/295 | 2002/0196492 A1 | 12/2002 | Trisnadi et al. ............. 359/124 |
| 2002/0079432 A1 | 6/2002 | Lee et al. .................... 250/216 | | | |
| 2002/0105725 A1 | 8/2002 | Sweatt et al. ................ 359/566 | * cited by examiner | | |

FIBER OPTIC TRANSCEIVER

BACKGROUND OF THE INVENTION

1. Field of the Invention

The present invention relates to the field of fiber optic transceivers. More particularly, the present invention relates to the use of MEMS technology including tilting plates and grating light valves to modulate an uplink signal by controlling the position or angle of micro reflectors.

2. Description of the Prior Art

In fiber optical communications, a laser is modulated to carry a signal through a fiber optical channel. In "last mile" network applications, however, such as hybrid fiber-coax networks, fiber-to-the-curb, and passive optical networks, it is desirable to have bi-directional communication capability without requiring the use of a laser internal to the terminal node. FIG. 1 illustrates one way of accomplishing this according to the prior art. A source node 102 such as a central office has a laser 108 for transmitting an optical signal over a fiber channel. The terminal node 104, depicted as a building ancillary to the central office, lacks a laser. The downlink signal $\lambda_{down}$ may be modulated at a frequency of 1 GHz with a bandwidth from 0.5 GHz to 1.5 GHZ. Information can be transmitted on the downlink signal $\lambda_{down}$ 112, typically in digital format. Because the terminal node 104 lacks a laser source, to bi-directionally transmit as well as to receive information from the terminal node 104, the incoming signal or downlink $\lambda_{down}$ 112 is passed through a beam splitter 116. Typically, a beam splitter 116 simply consists of a transparent surface at an angle such that a portion 122 of the downlink signal $\lambda_{down}$ 112 passes directly through the surface of the beam splitter 116, striking the surface of a detector 122, where it is converted to electrical signals. A second portion 124 of the downlink signal $\lambda_{down}$ 112 is reflected by the beam splitter 116 into a modulator 120.

The portion 124 of the downlink signal $\lambda_{down}$ 12 reflected into the modulator 120 is then used as a carrier signal for the modulated uplink signal 128, $\lambda_{up}$ The modulator 120 creates an uplink signal 128 for transmission from the terminal node 104 to the source node 102 by imposing a waveform or envelope, typically digital in nature, upon the incoming carrier signal 124. With a carrier signal 124 of 1 GHZ, the modulator will typically impose a modulated signal 128 on the order of 100 MHz upon the carrier signal. The modulated signal 128 is reflected off the beam splitter 116 resulting in a reflected signal 132 which forms the actual uplink signal $\lambda_{up}$ which is transmitted back to the source node 102. Additionally, a portion 130 of the modulated signal 128 passes through the beam splitter 116 and is typically wasted. To prevent incoming laser light $\lambda_{up}$ of the reflected uplink signal 132 from entering the source laser 108, a circulator 110 channels the uplink signal $\lambda_{up}$ to a source detector 106, where it is typically converted to an electrical signal.

Numerous limitations and liabilities attend the modulation of an uplink signal according to this process. First, packaging cost is increased by use of a beam splitter as depicted in the prior art. Moreover, a beam splitter according to the prior art is a "lossy" transmission and reflection medium since the splitting ratio is applied both to the downlink signals and the uplink signals. The splitting of the downlink signal 112 is essential to transmit a first portion 122 of the downlink signal to the detector while reflecting a second portion 124 of the downlink signal to the modulator 120. However, there is no benefit to splitting the modulated signal 128 through the same beam splitter 116. As noted, a portion 130 of the modulated uplink signal 128 passes through the beam splitter 116 and is effectively wasted. Only a fraction 132 of the modulated uplink signal 128 is reflected back into the uplink transmission stream toward the circulator 110. All transmissions therefore, must anticipate and accommodate the lost energy and lost light intensity represented by this waste. What is needed therefore is a method and apparatus for creating a modulated uplink signal that avoids the packaging costs incurred through beam splitters according to the prior art. There further exists a need for a method and apparatus that avoids the waste incurred through channeling a modulated uplink through a beam splitter according to the prior art.

BRIEF SUMMARY OF THE INVENTION

The present invention provides a means of modulating an incoming optical signal to transmit a second signal using the incoming signal as a carrier signal. The present invention further discloses a means of modulating an incoming signal without the use of a beam splitter. The present invention further discloses a method and apparatus for creating a modulated uplink signal that avoids the packaging costs incurred through beam splitters according to the prior art. The present invention further provides a method and apparatus that avoids the waste incurred through channeling a modulated uplink through a beam splitter according to the prior art.

A fiber optic transceiver capable of bi-directional communication comprises an incoming optical signal, a detector comprising a detecting surface configured to detect a detected portion of the incoming optical signal that strikes the detecting surface, and a light modulator for modulating a reflected signal. The reflected signal comprises a reflected portion of the incoming signal. The light modulator comprises a controllable reflection member for modulating the reflected signal and a controller configured to control the controllable reflection member. The reflected signal is modulated by the modulator at a frequency substantially slower than a frequency of the incoming optical signal.

According to one embodiment of the present invention, the controllable reflection member is mounted on a tilting plate operatively coupled with a stable surface. The controller controls an angle of the tilting plate relative to the incoming optical signal. The controller is configured to position the tilting plate at a first angle and a second angle. When the tilting plate is positioned at the first angle, the reflection member will direct a first intensity of the reflected signal into the optical channel. When the tilting plate is positioned at a second angle, the reflection member will direct a second intensity of light into the optical channel. The modulated intensities of light entering the optical channel thereby comprise a modulated digital uplink signal.

According to one embodiment of the present invention, the reflection member comprises a diffraction grating comprising a plurality of elongated elements, including a first elongated element with a first reflective surface defining a first plane and a second elongated element with a second reflective surface defining a second plane substantially parallel to the first plane. The controller is capable of controlling the diffraction pattern created by light reflecting off of separate elongated elements by deflecting select elongated elements by means of an electric field, thereby controlling the separation distance between the plane of the first reflective surface and the plane of the second reflective surface, including a first separation distance and a second separation distance. The field is controlled by a control signal supplied by the controller. The first separation distance between the plane of the first reflective surface and the plane of the second reflective surface creates a first diffraction pattern within the reflected signal. The first diffraction pattern is selected to direct a first intensity of the reflected signal into the optical channel. The second separation distance creates a second diffraction pattern within the reflected signal. The second diffraction pattern is selected to direct a second intensity of the reflected signal into the optical channel. The first and second intensity levels are distinct. A focusing member is configured to direct a portion of the reflected signal toward the optical channel.

According to one embodiment of the present invention, a method for transmitting an optical signal comprising the steps of receiving an incoming optical signal, reflecting a portion of the incoming signal off of a reflecting member, thereby forming a reflected signal, and controlling the reflecting member to modulate the signal containing information, the control performed by a controller. According to one embodiment, a portion of the incoming optical signal is directed to a detector and detected.

DETAILED DESCRIPTION OF THE INVENTION

U.S. Pat. No. 5,311,360 entitled "METHOD AND APPARATUS FOR MODULATING A LIGHT BEAM" and U.S. Pat. No. 5,841,579 entitled "FLAT DIFFRACTION GRATING LIGHT VALVE to Bloom et al. and U.S. Pat. No. 5,661,592 entitled "METHOD OF MAKING AN APPARATUS FOR A FLAT DIFFRACTION GRATING LIGHT VALVE" to Bornstein et al., are herein incorporated by reference.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

It is understood that substitutions of such equivalent structures of this and other components recited within the disclosure of the present invention are within the intended scope of the present invention. For example, reference will be made to a bi-directional communication capability. It is understood, however, that the present invention could be used to modulate a downlink carrier signal which is not transmitting information to a detector, but only providing a laser light source to end nodes for use by end nodes in modulating a laser signal to communicate to an uplink. Similarly, a grating light valve used in conjunction with the present invention is described as having alternatively fixed and movable "ribbons" or "elongated members." It is understood, however, that other embodiments of grating light valves may be substituted wherein none of the ribbons are "fixed," but rather, wherein all ribbons are controllable by the controller. Accordingly, although the following detailed description of the present invention includes numerous specific details are set forth in order to provide a thorough understanding of the present invention, it will be readily apparent to one of ordinary skill in the prior art that the present invention may be practiced without these specific details. Minor variations of the disclosed invention will immediately become apparent to those skilled in the art. In other instances, numerous details which are commonly known and understood by those skilled in the art have not been recited within the present disclosure so as not to unnecessarily obscure aspects of the present invention. Accordingly, the figures and detailed description recited herein are not intended to limit the present invention, but are merely intended to illustrate a particular implementation of the present invention, and to enable those skilled in the art to utilize the principles of the invention set forth herein.

Figure 1:
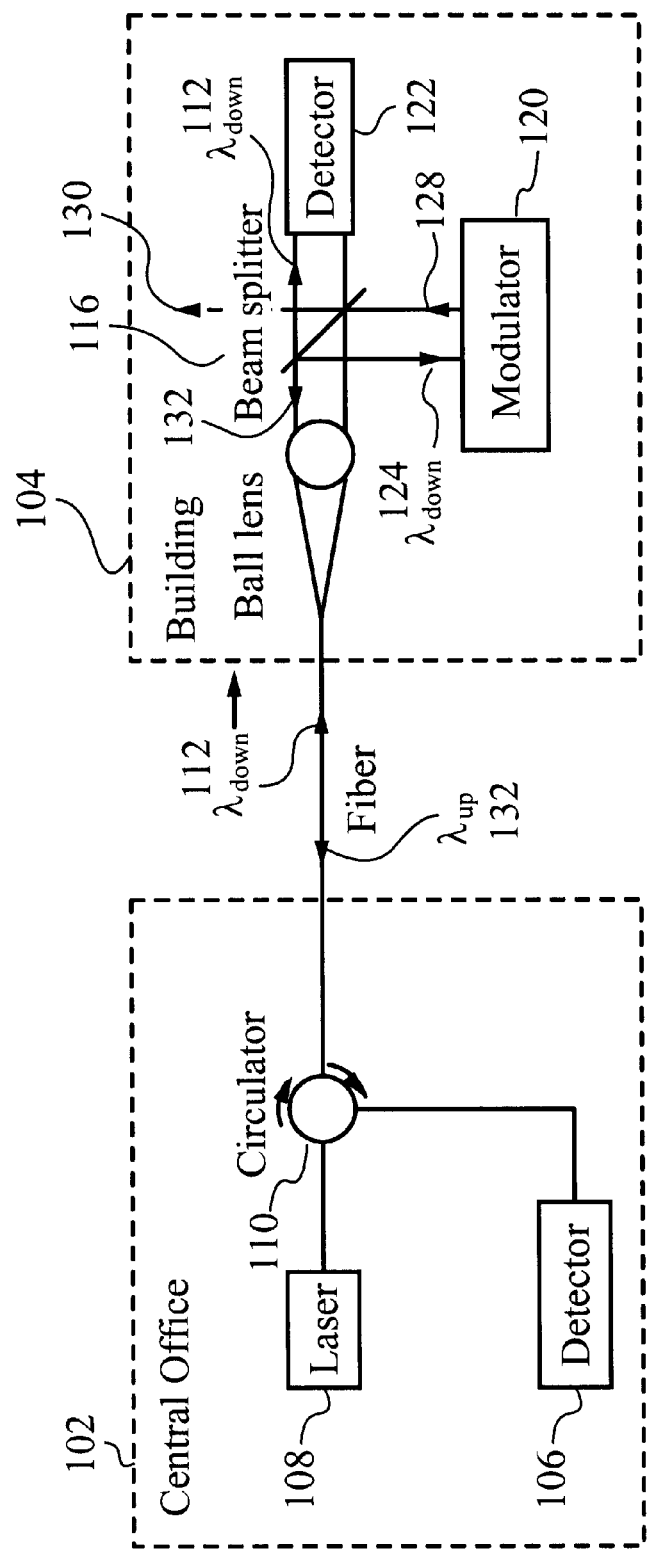
FIG. 1 is an optical network including a beam splitter and modulator according to the prior art.
Figure 2:
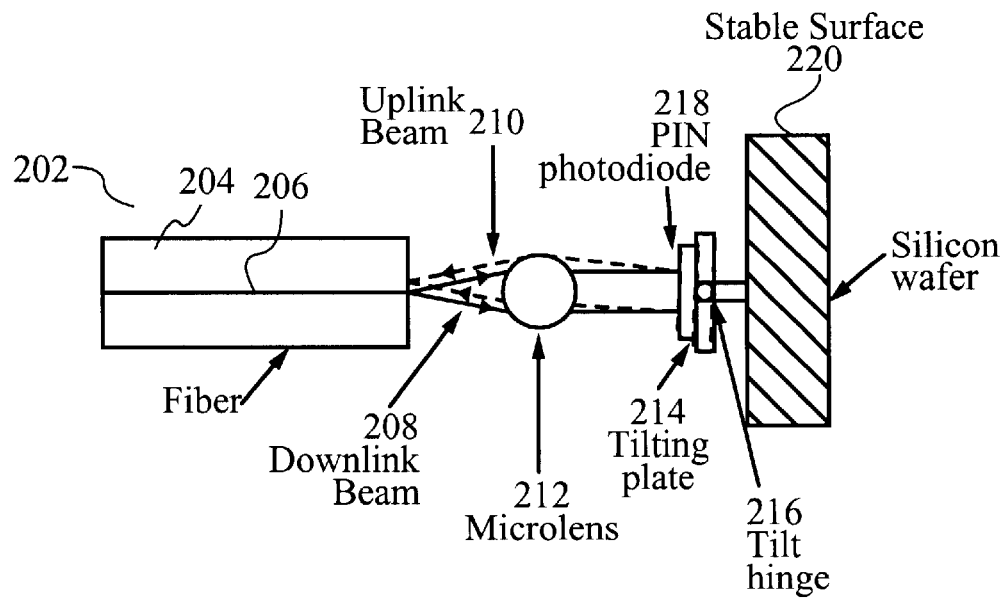
FIG. 2 is a tilting plate MEMS modulator according to the present invention.
Figure 3:
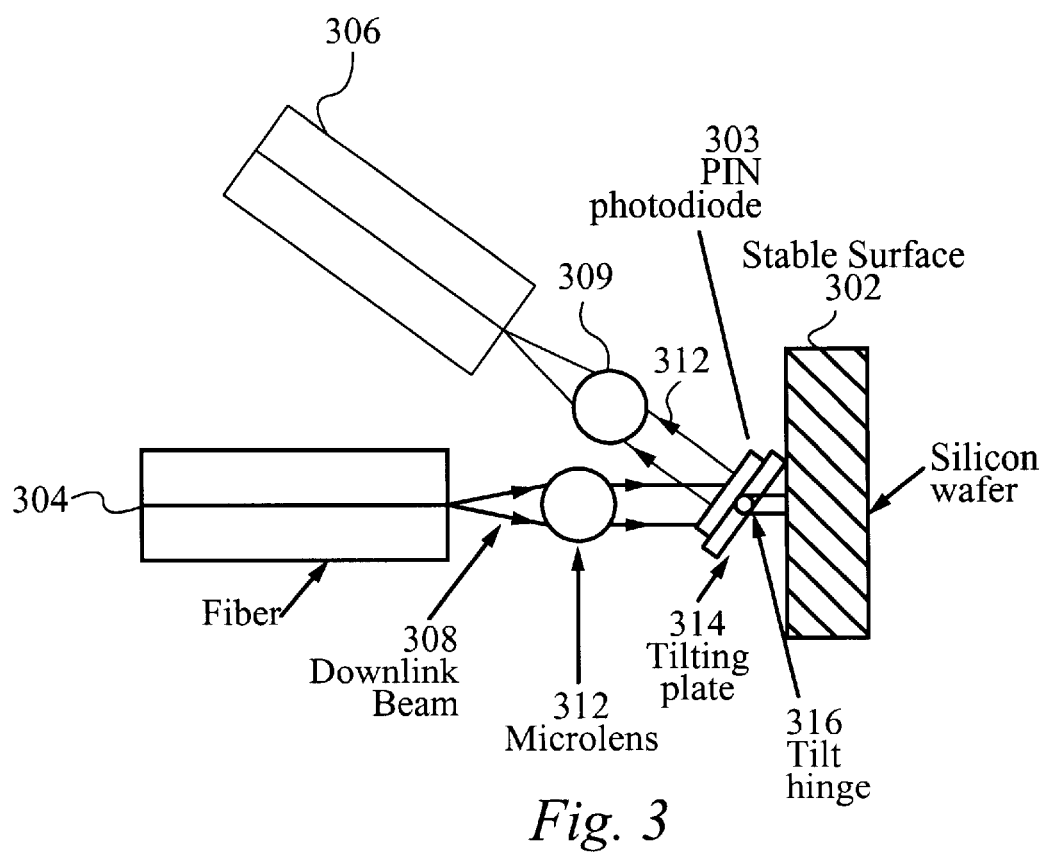
FIG. 3 is an alternative embodiment of a tilting plate.

FIG. 2 shows one embodiment of the present invention using a micro-electro-mechanical tilt plate 214 in place of the beam splitter 116 and modulator 120 of the prior art. A fiber optical channel 202 comprising a cladding 204 and a core 206 transmits a downlink signal 208 through a micro lens 212 onto a tilting plate. Preferably, the tilting plate comprises a detecting surface such as a PIN photodiode 218 and a reflecting surface. Even more preferred, the detecting surface 218 itself comprises reflective qualities as well, and is configured to reflect a beam of light; thereby serving as a detecting surface and a reflecting surface simultaneously. Alternative embodiments are envisioned according to FIG. 3, wherein the surfaces mounted on the tilting plate 314 may comprise separate reflective 302 and detecting 303 surfaces. Alternatively, embodiments are envisioned wherein only a reflecting surface is disposed upon the tilting plate, and the detecting surfaces are mounted on a surface other than the tilting plate 214, such as the stable surface 220 depicted in FIG. 2. The present discussion, which is referenced in terms of the preferred embodiment, including a single reflecting/detecting surface wherein the detecting surface is disposed upon the tilt plate and exhibits reflective qualities, is not intended to limit the tilt-plate embodiment of the present invention. It will readily be understood by those skilled in the art that the tilting plate of the present invention could be equally incorporated in these alternative embodiments.

A micro lens 212 is positioned to direct an incoming beam of light from the optical fiber 202 onto the detecting/reflective surface 218 and to receive the reflected signal off of the reflective surface 218 and focus it proximate the optical fiber 202. The tilting plate 214 and micro lens 212 are configured such that the uplink beam 210 is focused toward the optical fiber channel 202. By controlling the angle of the tilting plate 214 with respect to the incident beam of the downlink signal 208, the angle of the reflected beam can be controlled. Accordingly, the focal point of the reflected or uplink beam 210 can be made to fall more closely to the center core 206 of the optical channel 202, or off center from the core 206, as pictured in FIG. 2. As the reflected uplink beam 210 is directed off center from the core 206 of the optical channel 202, the intensity of light entering the optical channel 202 is reduced. Alternatively, as the tilting plate is maneuvered such that the uplink beam 210 is focused more closely to the center of the fiber core 206, the intensity of light entering the optical channel 202 is increased. The two state control of the tilting plate between a first and second position serves to modulate the uplink beam of light from low to high intensity, thereby modulating a digital uplink signal between a first and second state. It is understood that equivalent structures can be substituted wherein separate optical channels 304, 306 (FIG. 3) are used for down link 310 and up link 312 signals, including a downlink optical channel 304 for transmitting a downlink signal 310 onto the detecting/reflective surfaces 303, 302 and an uplink optical channel 306 to receive the reflected signal 312 from the detecting/reflective surface 303, 302. When such equivalent structures are substituted, separate corresponding micro lenses 308, 309 will advantageously be used as well, including a downlink lens 308 advantageously positioned to focus an incoming beam of light 310 from the downlink optical channel 304 onto the detecting/reflective surface 303, 302 and an uplink micro lens 306 advantageously positioned to focus reflected light from the detecting/reflective surface 303, 302 toward the uplink fiber optical channel 306.

Returning to the preferred embodiment of FIG. 2, the tilting plate 214 is disposed upon a hinge mechanism 216. For illustrative purposes, the hinge is represented in terms of traditional mechanical hinges. It is understood, however, that the present invention is designed for micro-electromechanical systems. Those skilled in MEMS technology are familiar with a variety of mechanisms for incorporating a hinge structure. One common embodiment for a torsion hinge is silicon nitride. The tilting plate 214 and tilt hinge 216 are mounted on a stable surface shown to include a silicon wafer. The silicon wafer includes integrated electronics and actuators. Both electrostatic and magnetic actuator technology are well known to those skilled in the art.

A modulator (not shown) controls an electrical signal which is used to control the position of the tilting plate. By modulating the angle of a tilting plate at a frequency substantially under a carrier frequency, the modulator may impose a waveform envelope upon the carrier wave, thereby modulating an uplink signal.

Because laws of classical mechanics dictate that a greater force is needed to tilt larger and more massive tilting plates at the same speed as smaller ones, those skilled in the art will understand that in order for a tilting plate 214 embodiment of the present invention to modulate a reflected light signal at the desired frequencies, typically in the range of 10 MHz to 100 MHz, the size of the tilting plate 214 depicted in FIG. 2 will preferably be on the order of 10 microns to 100 microns.

The tilting plate structure according to the present invention can also be used to transmit more advanced information signals than simply a two state binary transmission. By controlling the tilting plate 214 to reflect three or more discrete intensity levels into the optical channel 202, the present invention can be used to transmit signals based on number bases other than base two. Accordingly, as information processing advances from a two-state or binary character of information to a poly-state character of three or more states, the tilting plate embodiment of the present invention is ideally suited to transmit information conforming to these formats.

Figure 4:
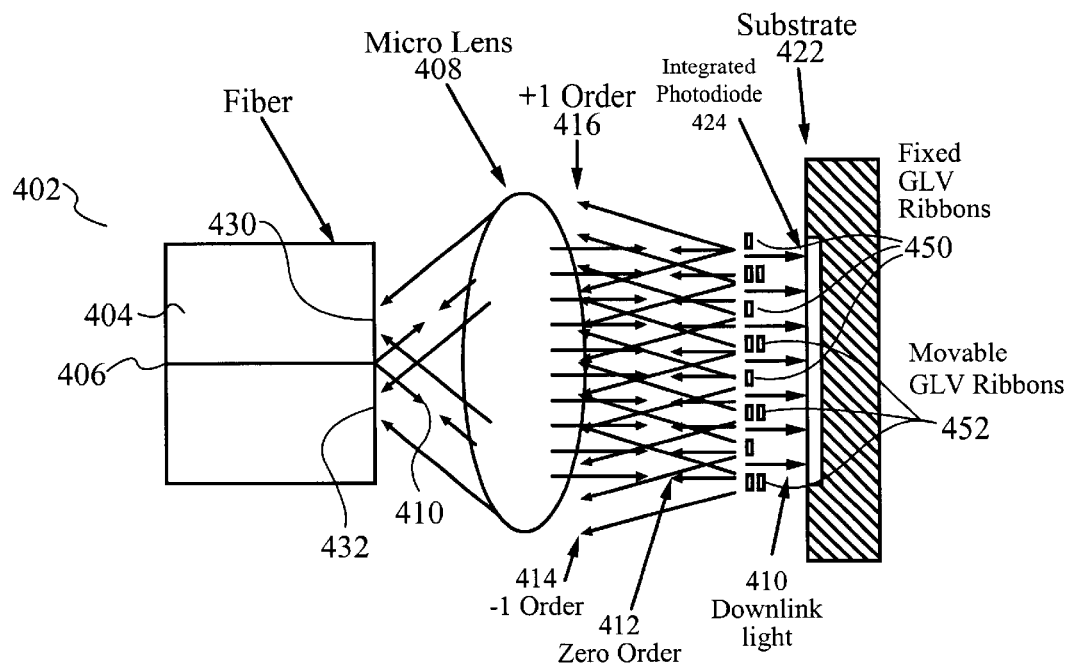
FIG. 4 is a GLV MEMS modulator according to the present invention.

FIG. 4 discloses a grating light valve embodiment of the present invention. A fiber optical channel 402 comprising a cladding 404 and a core 406 transmits a downlink optical signal 410 through a micro lens 408 to a grating light valve comprising GLV ribbons 450, 452. The structure and operation of grating light valves are taught in U.S. Pat. Nos. 5,311,360 and 5,841,579 to Bloom et al. and U.S. Pat. No. 5,661,592 to Bornstein et al., which are herein incorporated by reference. Although FIG. 4 of the present invention depicts a GLV ribbon structure of alternating fixed ribbons 450 and movable ribbons 452, it is understood that other embodiments are envisioned, such as GLV structures wherein all the ribbons are controllable.

According to the present invention, space is left between various GLV ribbons 450, 452 to allow a portion of the incoming light or downlink signal 410 to pass through to the integrated photodiode 424. The integrated photodiode 424 converts the downlink light 410 striking the photodiode 424 surface to electrical signals. Light striking the ribbons 450, 452 of the grating light valve is reflected back toward the lens. Because laser light is coherent, when all of the GLV ribbons 450, 452 are disposed along the same plane, the reflected light remains coherent, resulting in a "specular" or zero order diffraction pattern 412, illustrated by reflected light returning directly to the lens along the same path through which it approached the grating light valve. The micro lens 408 and optical fiber 402 are positioned such that a specular reflective pattern 412 will be substantially focused upon the center core 406 of the optical fiber 402. Conversely, as alternating ribbons 450, 452 of the grating light valve are positioned in separate planes, a diffraction pattern will emerge from the reflected light. Typically, the greatest diffraction results from a planar offset of one quarter wavelength between the planar surfaces of two GLV ribbons 450, 452. At an offset of one quarter wavelength of the incoming or downlink signal, the light reflecting off the further row of ribbons, which are here seen to be the movable row 452 will travel exactly ½ wavelength further than the light reflecting off the upper row 450 of GLV ribbons, creating a phase difference of exactly 180 degrees. A phase difference between zero and 180 degrees can therefore be governed by adjusting the separation between the planar surfaces 450, 452 from zero to one quarter wavelength.

The specular, or zero order diffraction pattern seen in FIG. 4 is represented by arrows running from the GLV ribbons 450, 452 to the lens 408 at an orientation substantially parallel to the center core 406 of the optical channel 402. In contrast, arrows scattering at a slightly downward angle between the GLV ribbons 450, 452 and the lens 408 represent a diffractive component of −1 order 414, and the arrows scattering at a slightly upward angle represent a diffractive component of +1 order 416. The diffraction pattern comprising +1 order and −1 order components as seen in FIG. 4 is the product of the fixed GLV ribbons 450 and the movable GLV ribbons 452 being in a non co-planar relationship. As noted, this diffraction pattern exhibits dual wavefronts moving off center line compared with the specular reflection. This angular offset cannot be fully corrected by the micro lens 408 to form a single focal point centered on the center core 406 of the fiber network. As a result, the lens 408 generates two focal points from the diffracted light, a first focal point 430 above the center line of the fiber core 406, and a second focal point 432 below the center line of the fiber core 406. The intensity of light transmitted into the optical core 406 is substantially reduced by dual focal points 430, 432 offset from the center core 406 compared with the intensity of light transmitted into the core through specular reflection. By controlling the offset distance between the first set of ribbons 450 and the second set of ribbons 452, the amount of light delivered off-center and onto the spots 430 and 432 can be controlled. The more light projected off-center, the less light enters the core 406 of the optical fiber 402. Accordingly, the control of the ribbons 450, 452 modulates the amount of light entering the fiber core 406.

Figure 5:
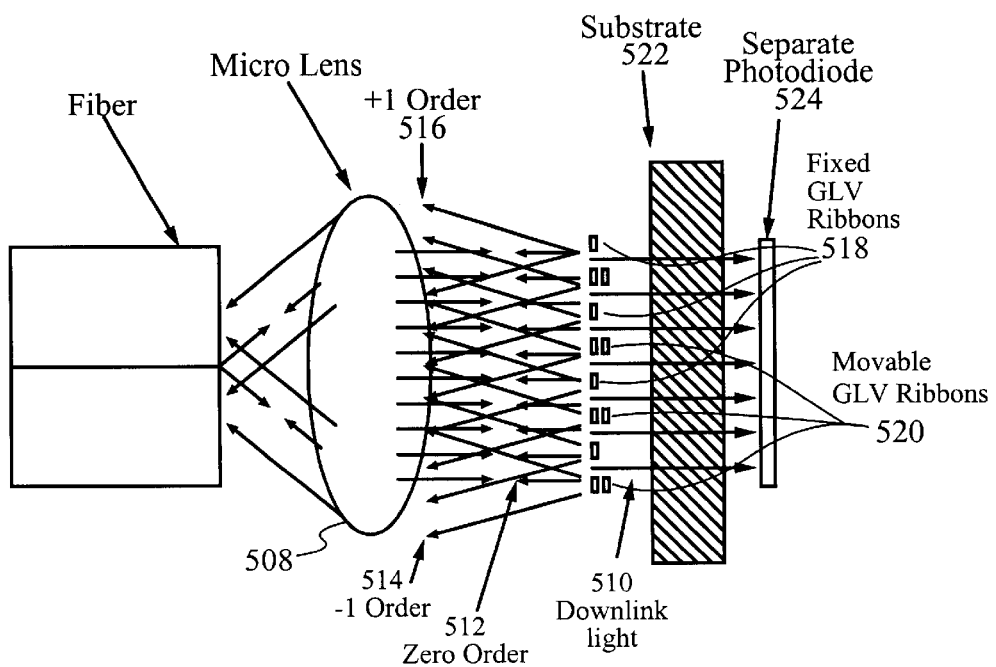
FIG. 5 is an alternative GLV MEMS modulator according to the present invention.

Each movable ribbon 452 is controlled by a field resulting from a voltage potential between a ribbon and a fixed conductive member within the substrate 422. Various voltage levels are controlled by a controller (not pictured). Although the present invention incorporates by reference existing patents on GLV technology, it is not intended to be limited to existing embodiments of grated light valves. Accordingly, the "substrate" 422, 502 depicted in FIGS. 4 & 5 is intended to represent the various components within a grating light valve other than the ribbons. This includes support members for supporting the GLV ribbons, bond pads, insulating layers, and related structural components of a grated light valve commonly known to those skilled in the art. In particular, the substrate depicted in FIGS. 4 and 5 is intended to include any conducting layers which may be used to establish a voltage potential within a GLV ribbon or to establish a voltage potential in a fixed member used to exert a field influence on the GLV ribbons.

Depending on the structure of a grating light valve, a control signal may comprise a single controllable voltage for controlling the deflection of select ribbons 452, or it may comprise the simultaneous imposition of several different controllable voltage levels upon various select components comprising the substrate 422.

As the control signal is applied to the substrate 422, of the grating light valve at a pre-selected frequency, the GLV ribbons 452 deflect according to the frequency and pattern of information carried by the control signal. As a portion of the downlink beam of light strikes the ribbons 450, 452 and reflects from them, the reflected optical signal forms an uplink signal modulated according to the frequency and pattern of information deflecting the GLV ribbons 452, effectively imposing a digital envelope according to the uplink frequency around the faster frequency of the downlink signal which serves as a carrier frequency. As noted, the uplink signal is directed through a micro lens 408, which focuses the uplink signal in a predetermined manner.

According to the embodiment of FIG. 4, the integrated Photodiode 424 is disposed between the GLV ribbons 450, 452 and the substrate 422. As seen, a first component of light reflects off the GLV ribbons 450, . . . 452 and produces the desired interference pattern. A second component of downlink light 410 passes through the GLV ribbons 450, 452 and strikes the surface of the integrated photodiode 424, thereby imparting the downlink signal to the detector.

Because the detector (the photodiode) 424, 524 typically comprises of some a material such as a Gallium Arsenide (GaAs) lattice or an Indium Phosphorous (InP) lattice, the detector 424, 534 is usually handled as a separate piece from the substrate 422. Accordingly, it can be convenient to dispose the detector 524 behind the substrate 522 as depicted according to FIG. 5. A substrate 522 such as silicon is substantially transparent to the downlink light 510 comprising a wavelength greater than 1300 nm. This configuration will allow light to pass through the substrate and strike the detector surface 504. Accordingly, the imposition of the substrate in front of the Photodiode will not substantially impair detection of the downlink signal.

What is claimed is:

1. A fiber optic transceiver capable of bi-directional communication comprising:
   a. an incoming optical signal;
   b. a detector comprising a detecting surface configured to detect a detected portion of the incoming optical signal that strikes the detecting surface;
   c. a light modulator for modulating a reflected signal; and
   d. a focusing member; and
   e. an optical channel,
   wherein the reflected signal comprises a reflected portion of the incoming signal,
   wherein the light modulator comprises a controllable reflection member for modulating the reflected signal,
   wherein the controllable reflection member is mounted on a tilting plate operatively coupled with a stable surface,
   wherein an angle of the tilting plate relative to the incoming optical signal is controlled,
   wherein the tilting plate is controllably positionable at a first angle and a second angle,
   wherein the tilting plate, the focusing member and the optical channel are configured such that a positioning of the tilting plate at the first angle directs the reflected signal through the focusing member in a manner calculated to impart a first intensity of the reflected signal into the optical channel, and a positioning of the tilting plate at the second angle directs the reflected signal through the focusing member in a manner calculated to impart a second intensity of the reflected signal into the optical channel, and
   wherein the first and second intensity levels are distinct.

2. The fiber optic transceiver according to claim 1 wherein a path followed by the reflected signal from the controllable reflection member to the focusing member is a straight line.

3. The fiber optic transceiver according to claim 1 wherein the tilting plate is controllably positionable at a third angle, wherein an intensity level of the reflected signal entering the optical channel when the tilting plate is at the third angle comprising a third intensity level.

4. The fiber optic transceiver according to claim 1 wherein the detecting surface comprises an integrated photodiode.

5. The fiber optic transceiver according to claim 1 wherein the reflected signal is modulated by the modulator at a frequency substantially slower than a frequency of the incoming optical signal.

6. The fiber optic transceiver according to claim 1 wherein the detecting surface is also mounted on the tilting plate.

7. The fiber optic transceiver according to claim 1 wherein the angle of the tilt plate is controlled through a controllable electric field.

8. The fiber optic transceiver according to claim 7 wherein the controllable electric field is disposed within the stable surface.

9. A fiber optic transceiver capable of bi-directional communication comprising:
   a. an incoming optical signal;
   b. a detector comprising a detecting surface configured to detect a detected portion of the incoming optical signal that strikes the detecting surface;
   c. a light modulator for modulating a reflected signal,
   wherein the reflected signal comprises a reflected portion of the incoming signal,
   wherein the light modulator comprises a controllable reflection member for modulating the reflected signal,
   wherein the detecting surface comprises an integrated photodiode, and
   wherein the reflection member comprises a diffraction grating comprising a plurality of elongated elements, including a first elongated element with a first reflective surface defining a first plane and a second elongated element defining a second plane substantially parallel to the first plane, and wherein a separation distance between the first plane and the second plane is controllable to a first separation distance and a second separation distance, the first separation distance calculated to create a first pattern of light distribution within the reflected signal, and the second separation distance calculated to create a second pattern of light distribution within the reflected signal.

10. The fiber optic transceiver according to claim 9 further comprising an optical channel, wherein the first pattern of light distribution is configured to provide a first intensity of the reflected signal into the optical channel, and the second pattern of light distribution is configured to provide a second intensity of the reflected signal into the optical channel, wherein the first and second intensities are distinct.

11. The fiber optic transceiver according to claim 10 wherein the first and second intensities of the reflected signal are directed into the optical channel by a focusing member.

12. The fiber optic transceiver according to claim 11 wherein a path followed by the reflected signal from the controllable reflection member to the focusing member is a straight line.

13. The fiber optic transceiver according to claim 10 wherein the first pattern of light distribution pattern exhibits no substantial diffraction.

14. The fiber optic transceiver according to claim 13 wherein the second pattern of light distribution is a diffraction pattern.

15. The fiber optic transceiver according to claim 14 wherein the separation distance is further controllable to a third separation distance resulting in a third light distribution pattern within the reflected signal, the third light distribution pattern selected to provide a third intensity of the reflected signal into the optical channel.

16. The fiber optic transceiver according to claim 9 wherein the separation distance between the first plane and the second plane is controlled through a controllable electric field configured to deflect select elongated elements.

17. The fiber optic transceiver according to claim 16 wherein the controllable electric field is disposed within a substrate.

18. The fiber optic transceiver according to claim 16 wherein the detecting surface is disposed between the incoming signal and the substrate.

19. The fiber optic transceiver according to claim 16 wherein the substrate is disposed between the incoming signal and the detecting surface, and wherein the substrate is selected from a material which will allow a portion of the incoming signal to pass through the substrate.

20. The fiber optic transceiver according to claim 9 wherein the detecting surface comprises an integrated photodiode.

21. The fiber optic transceiver according to claim 9 wherein the reflected signal is modulated by the modulator at a frequency substantially slower than a frequency of the incoming optical signal.

22. A method for transmitting an optical signal comprising the steps:
 a. receiving an incoming optical signal;
 b. reflecting a portion of the incoming signal off of a reflective member, thereby forming a reflected signal; and
 c. controlling the reflecting member to modulate the signal containing information,
 wherein the reflecting member comprises a first elongated member with a first planar surface defining a first plane and a second elongated member with a second planar surface defining a second plane, the first and second planar surfaces being substantially parallel, and wherein the step of controlling the reflecting member further comprises the steps:
  a. controlling a separation distance between the first plane and the second plane; and
  b. directing the reflected signal through a lens,
  wherein the step of controlling the separation distance between the first plane and the second plane is calculated to control a diffraction pattern in such a way as to control an intensity of reflected light entering an optical channel.

23. The method of claim 22 wherein the reflected signal travels a straight line from the reflecting member to the lens.

* * * * *